June 19, 1956 M. M. MOORHEAD, JR 2,751,547

REGULATED POWER SUPPLY ELECTRONIC CONTROL CIRCUIT

Filed May 4, 1953 2 Sheets-Sheet 1

*INVENTOR.*
MILTON M. MOORHEAD, JR.
*BY* Toulmin & Toulmin
ATTORNEYS

REGULATED POWER SUPPLY ELECTRONIC CONTROL CIRCUIT

Filed May 4, 1953 2 Sheets-Sheet 2

INVENTOR.
BY MILTON M. MOORHEAD, JR.
Toulmin & Toulmin
ATTORNEYS

United States Patent Office 2,751,547

Patented June 19, 1956

2,751,547

REGULATED POWER SUPPLY ELECTRONIC CONTROL CIRCUIT

Milton M. Moorhead, Jr., Dayton, Ohio, assignor to The Commonwealth Engineering Company of Ohio, Dayton, Ohio, a corporation of Ohio Application May 4, 1953, Serial No. 352,883

5 Claims. (Cl. 323—22)

This invention relates to regulated power supplies.

It is within the contemplation of this invention to provide an improved regulated power supply having characteristics which produce a superior response and a direct current output which is ripple free; the primary objective of the invention is to obtain rapid response and freedom from ripple while maintaining a high degree of stability in a high gain direct current regulated power supply.

Generally speaking the objectives of the invention are attained by providing in a regulated power supply, in parallel with the direct current amplifier, an alternating current amplifier. This inclusion of the alternating current amplifier in parallel results in the addition of the gain characteristics of the alternating current and direct current amplifiers, and the overall gain characteristic of the arrangement is equivalent to the sum of the alternating current and direct current gain, thus achieving high gain values of alternating current and therefore improved performance, without a sacrifice of stability in the high gain direct current power supply.

The invention will be more fully understood by reference to the following detailed description and accompanying drawings wherein.

Figures 3, 5:
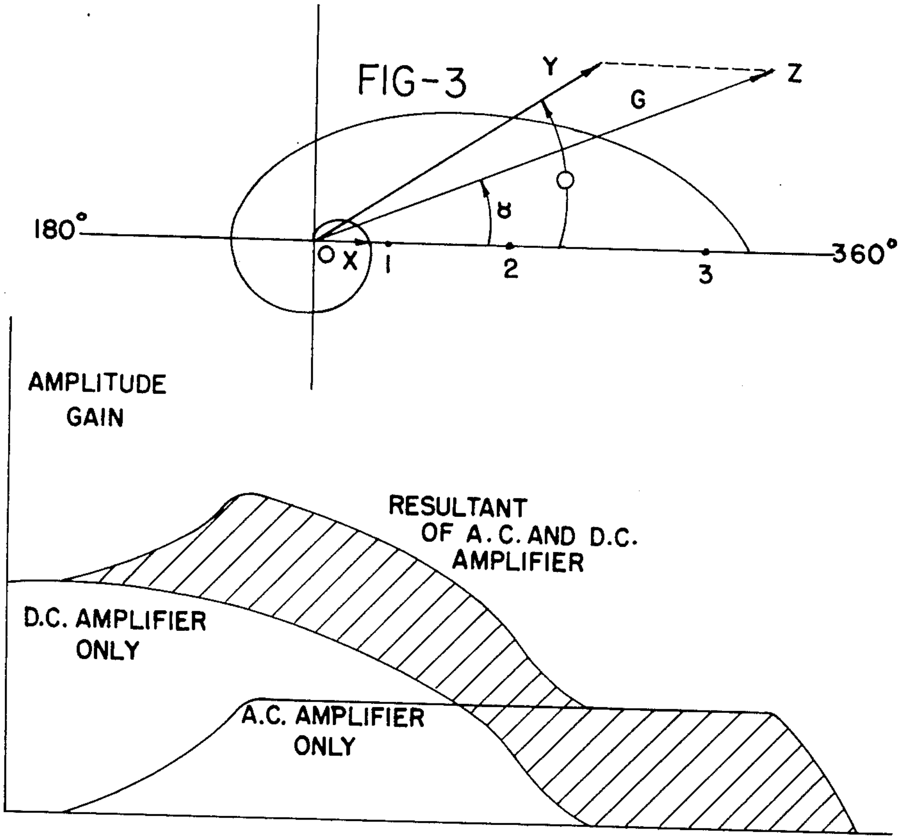
Figure 3 is a plot which includes a curve of a stable amplifier in accordance with one embodiment of the invention.

Figure 5 graphically illustrates the relationship between the amplitude gain and the logarithm of the frequency for the D. C. amplifier, A. C. amplifier and their summed outputs.

Initially it should be noted that a regulated power supply may be considered to consist, in essence, of a power amplifier with a 100 percent voltage feed-back, and which amplifier is provided with an input in the nature of a reference standard voltage source or a selected fraction thereof. It is desirable that in a regulated power supply that the output voltage be at all times exactly equal to the input voltage regardless of disturbances occurring because of load changes, power line fluctuations or any other irregularities; more specifically, the voltage gain for the power amplifier should be unity.

It is recognized that for unity feed-back the following equation is applicable:

$$A'=\frac{A}{1+A}$$

where A′ represents the complex voltage gain factor of a unity feed-back system and A is the complex voltage gain without feed-back. The complex gain factor itself is that gain which consists of a change in magnitude and a change in phase position for each frequency between zero and infinity.

Since, for the desired conditions noted above, A′ should equal 1 it is evident that A should be made as large as possible for every frequency which is of concern in the output of the supply including that band of frequencies in which the important disturbances due to line fluctuation, ripple and so forth occur.

Figure 1:
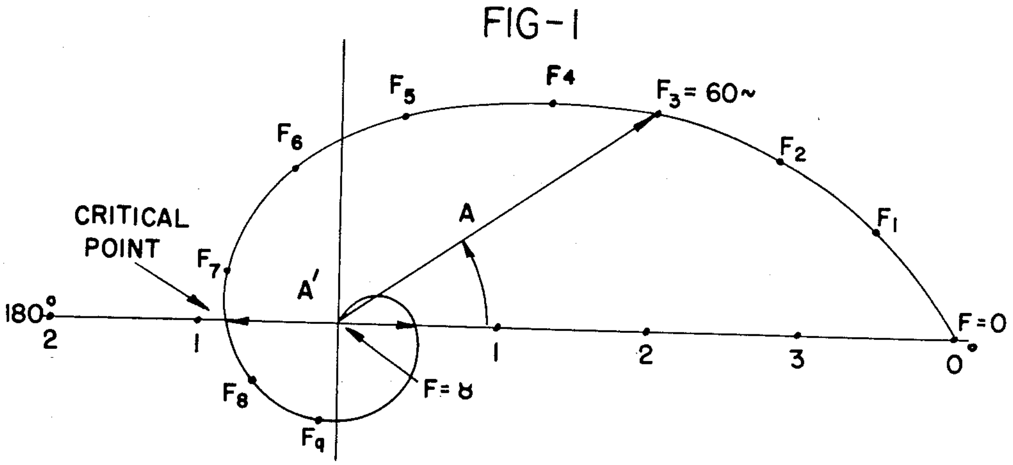
Figure 1 is a plot which illustrates the Nyquist Stability Criterion.

The amplification obtainable however is definitely limited in the customary amplifier circuit arrangement, since increasing the number of stages in a feed-back amplifier leads to instability and amplifier oscillation, rendering it useless as an amplifier. The determination as to whether or not oscillations will be set up in the amplifier is made by reference to the nature of gain A (without feed-back), the curve of which may be plotted in polar coordinates for all frequencies at which the gain A of the amplifier is greater than zero. For the feed-back system to be stable, the amplifier gain must be less than unity at any frequency where the total accumulated phase shifts around the feed-back loop are equal to 360°. More specifically, if the plotted curve does not enclose the point 1+JO the amplifier will not oscillate. This is in accordance with the theory of H. Nyquist, termed the Nyquist Stability Criterion, and may be more fully understood by reference to Figure 1 wherein it is to be noted that the phase angle $\phi$ increases with increasing frequency and that, at the critical point, at which the curve crosses the 360 degree axis, A must have a value of less than unity.

It is therefore clear that another approach is required than that of simply increasing the number of stages since each stage added changes the phase angle at all frequencies by 180° and otherwise enhances the possibility of a cumulative phase shift of 360° occurring at some frequency where it is necessary to have a gain value considerably greater than unity in order to achieve satisfactory ripple reduction.

The gain at any particular frequency may be reduced by including a low pass filter in the circuit, but this approach to the problem is limited, for while the filter is effective to kill the tendency to oscillate and a stable circuit results, capable of putting out a regulated direct current output, the alternating current gain is low, occasioning poor response and excessive ripple. Attempts to increase the number of stages to increase the gain A results in a requirement for more filtering, which depresses A at alternating current frequencies still further, so that the only increase in gain realized is that at zero or very low frequencies, while for good response high gain must exist at the ripple frequency. It is to be understood that rather complicated circuit arrangements may be developed to achieve a satisfactory gain A by inclusion of complex band elimination filters, but it is undesirable due to the effect on the circuit of the filters as well as the complex circuitry involved.

Thus by use of a low pass filter a system may be developed in which the output direct current voltage is precision controlled and which is stable, however the alternating current gain is attenuated to the extent that the circuit is sluggish in response and has an excess ripple.

Figures 2, 4:
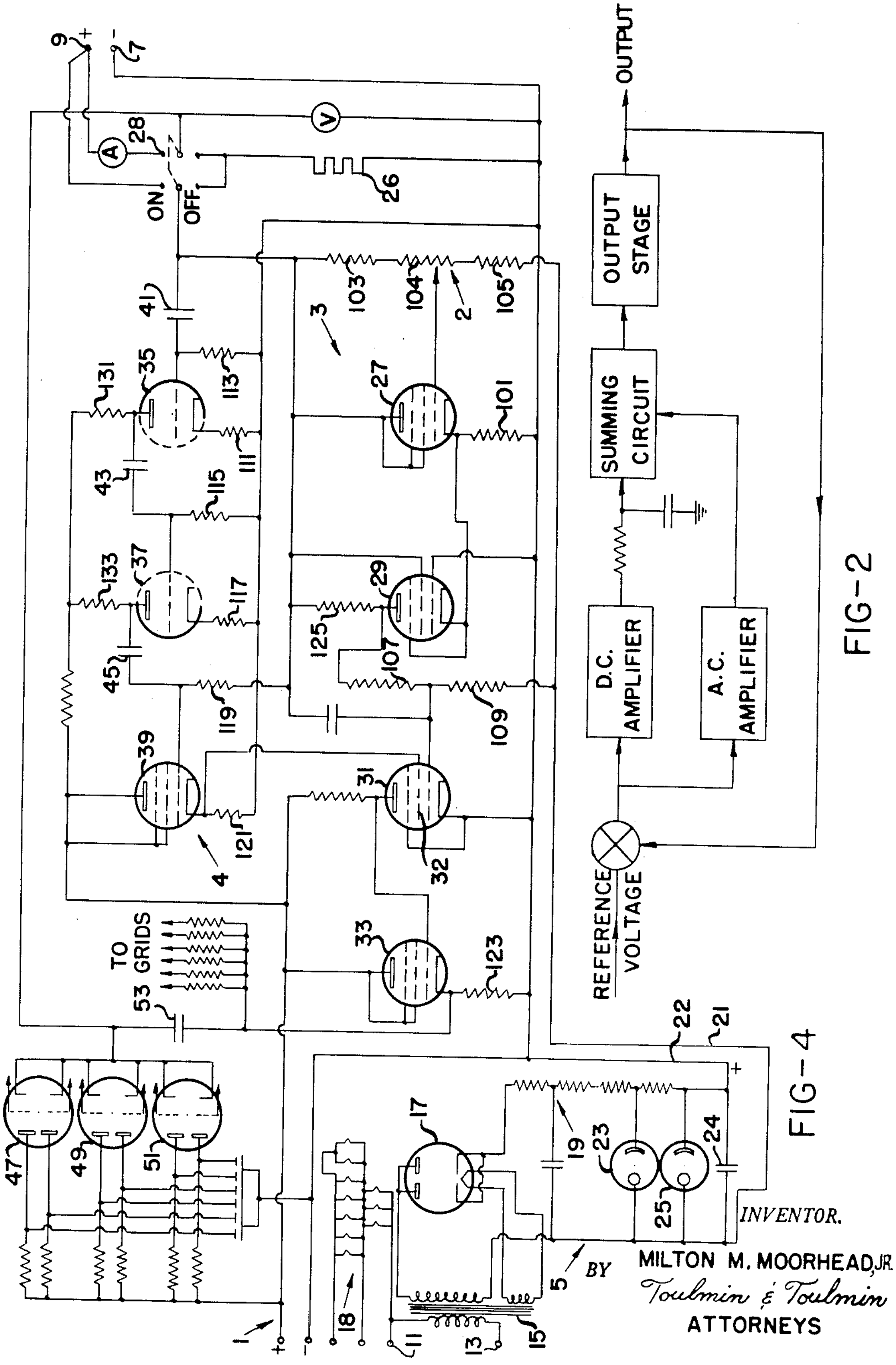
Figure 2 is a block diagram illustrating one embodiment of the invention.
Figure 4 is a circuit diagram embodying the features of this invention.

Figure 2 is a block diagram arrangement of a circuit for overcoming these defects. Thus as appears from the diagram the new circuit arrangement includes in addition to the direct current amplifier an alternating current amplifier parallel therewith; the output of this alternating current amplifier is added to the filtered output of the direct current amplifier in a summing circuit, and this output is passed through an output stage, whereafter the voltage is fed back to the input of the arrangement. With this arrangement the voltage gains of the alternating current and direct current amplifiers are added, while the phase shift itself is reduced over that of the direct current amplifier, as may be more clearly seen from a consideration of Figure 3.

Referring to Figure 3, if it be assumed that the open loop complex gain characteristics of a multi-stage direct current feedback amplifier are as represented by the solid line curve, and that the characteristic curve crosses the 360° axis in the close proximity to the critical point, 1JO, at some alternating current frequency, for example say 10 kc., then it can be clearly seen that the gain of the amplifier at 10 kc. cannot be increased materially without producing an oscillatory system unless the phase shift at 10 kc. is reduced by some means.

Assuming now that it is desirable to increase the gain at 10 kc., which gain is represented by vector X, in a manner that will not result in an oscillatory system, and assume further that vector Y represents the gain of an alternating current amplifier at 10 kc., which gain is accompanied by a phase shift $\theta$ which is less than 360° by virtue of the fact that the alternating current amplifier is composed of fewer stages than the direct current amplifier. By consideration of the principles of vector addition it can be seen that if the alternating current and direct current amplifiers are operated in parallel and the gains of the amplifiers are summed, then the resultant gain at 10 kc. would be as indicated by the vector Z which is considerably longer in magnitude than vector X but which has a phase shift angle, $\alpha$ which is considerably less than 360°.

A similar analysis of this action at other frequencies will indicate a substantial improvement of the alternating current gain, one that is obtainable solely through the use of the direct current amplifier and a substantial improvement in stability characteristics over a wide range of frequencies.

To secure this gain G an amplifier having fewer tubes than the direct current amplifier is required since the phase angle thereof must be smaller than the direct current amplifier. Further, since the direct current gain is already adequate, this new amplifier may be an alternating current amplifier.

Accordingly an alternating current amplifier, as has already been indicated, is added in parallel with the direct current amplifier and coupled thereto to achieve the summing of the direct current and alternating current in the output.

It is important to note in connection with the coupling of the alternating current amplifier that RC coupling should be avoided as such would introduce undesirable time constants into the direct current amplifier output.

In specific application a circuit arrangement such as that shown in Figure 4 is highly effective to provide a ripple-free direct current output in a regulator having excellent response characteristics.

Essentially this circuit consists of a direct current input indicated at 1, a voltage sensitive arrangement indicated at 2, a direct current amplifier indicated at 3, an alternating current amplifier indicated at 4, a bias supply indicated at 5 and an output, terminals of which are indicated at 7 and 9.

Referring first to the bias supply, it will be noted that line voltage such as 115 volt alternating current is supplied through terminals 11 and 13 to transformer 15, the secondary of which is connected to a rectifier tube 17 such as a 6X4. The output of this rectifier tube is passed through a filter 19 and supplies the bias to the various tubes of the circuit arrangement through leads 21, 22, the latter being at ground potential. Indicated generally at 18 and connected to the input of the bias are the heaters for the filaments of the various tubes described hereinafter.

Across the output of the rectifier are a pair of glow tubes 23, 25 the voltage across which remains constant over a wide range of current flow through the tubes and the particular purpose of which is described more fully hereinafter. Also across the output is a rather large condenser 24.

In the following description the low side of the input is referred to as ground for sake of convenience.

The direct current amplifier is preferably constituted by four 6AH6's indicated at 27, 29, 31 and 33 respectively. Tubes 27 and 33 function as isolator tubes for 29 and 31, the latter of which receives a D. C. signal from tube 29 on one grid thereof, and an A. C. signal from the A. C. circuit on another grid 32 thereof, for summing of the signals.

More specifically the cathode of tube 27 is tied to one side of the output of the power supply through resistor 101 while the control grid thereof in the closed position of switch 28 is connected to the plus side through dropping resistors 103, 105 and 104; the latter resistor serves as a potentiometer and permits selection of the grid voltage.

Tubes 27 and 29 are cathode connected and the applied signal is thus transmitted to the latter tube, the control grid of which is at ground or the potential of the negative side of the power supply output. The plate of tube 29 is connected through resistor 107 to the control grid of tube 31 and is also conected to the bias supply through a high value resistance 109 of about 1 megohm. The plate of tube 29 is provided with a load resistor 125.

The cathode of tube 31 is maintained at a constant level of potential as it is connected to ground; the plate of this tube 31 is connected through a plate load resistor to the positive side of the input of the power supply and is directly connected to the grid of isolator tube 33.

The second or screen grid 32 of tube 31 is supplied with an A. C. voltage from the alternating current amplifier which comprises a 12AX7 and a 6AH6, one-half of the 12AX7 being indicated at 35, the other half at 37, and the 6AH6 being shown at 39.

Condenser 41 keeps direct current off the control grid of tube 35 while the alternating currents arising from the hereinbefore noted disturbances are applied to the grid. The cathode of this tube 35 is connected to the grounded side of the line through the cathode bias resistor 111, while grid leak resistor 113 ties the grid to the same side of the line. The plate of tube 35 is coupled to the grid of tube 37 through a conventional resistance-capacitance network 43, 115.

The cathode of tube 37 is provided with a cathode bias resistor 117 of about 560 ohms, similar to resistor 111, and the plate of this tube is coupled to the grid of tube 39 through the resistance-capacitance network 45, 119.

The cathode of tube 39 is grounded through cathode load resistor 121 and the alternating current signal is passed to the screen grid of tube 31 from the cathode of tube 39. The plate of the tube is directly connected to the plus side of the power supply.

Thus in tube 31 the direct current signal and alternating current signal are mixed and fed from the plate to the grid of isolator tube 33; the error signal is then applied to the grids of tubes 47, 49 and 51 (6AS7's). The cathode of tube 33 is connected to ground through cathode load resistor 123 and the cathode itself is connected to the grids of tubes 47, 49, 51. This cathode is also coupled to the cathodes of the same tubes through condenser 53. The tubes 47, 49 and 51 constitute a variable impedance series regulated arrangement—the voltage drop accordingly is varied to compensate for changes in input voltage.

The power supply for tubes 27 and 29 is derived from the regulated output voltage, whereas the power supply for tubes 31, 33, 35, 37 and 39 is derived from the direct current input voltage.

Considering now the operation of the circuit, if a constant ripple free voltage exists at the output across terminals 7, 9, with switch 28 closed a direct current flows toward condenser 41 from the switch. Since the potential occasioning the flow is positive with respect to ground and since direct current will not pass condenser 41, a positive potential is placed upon the plates of tubes 27 and 29, the latter being provided with a suitable plate load resistor 125. Thus, with tube 17, that is the rectifier, in operation, current flow occurs in the tubes and places a constant potential on the grid of the tube 31, and this tube and tube 33 also impress a constant voltage drop across tubes 47, 49 and 51 and accordingly the output remains steady. The alternating current amplifier which includes tubes 35, 37 and 39 is not at this time in operation, nor is the substitute load indicated by resistor 26.

Should the direct current voltage vary in magnitude at the input—if, for example, the input increases to a new steady value the change is reflected at resistor 104 and compared with the rectifier output; the resultant voltage controls the operation of tubes 27, 29, 31 and 33 to increase the bias on the grids of tubes 47, 49 and 51, thereby effectively increasing the voltage drop across these tubes and accordingly decreasing the voltage output at terminals 7, 9—thereby the voltage output is maintained constant. The action is similar if the output voltage tends to fall.

Should a ripple voltage occur the output at 7, 9 then tends to vary and the alternations are reflected in the alternating current amplifier 4 since the alternations will pass condenser 41. The output of the alternating current amplifier is applied to the second grid (32) of tube 31; the direct current component of the variation appears as described hereinbefore at the control grid of tube 31 and accordingly the output of tube 31 to isolator tube 33 and the grids of tubes 47, 49, 51 contain the resultant of the direct current and alternating current variations; the grids of tubes 47, 49 and 51 are accordingly biased in accordance with the resultant, and the fluctuations, and the change in voltage thereacross maintain the output voltage constant.

The curve of Figure 5 illustrates the improvement attained with the incorporation of the alternating current amplifier; with the direct current amplifier only the gain drops off rapidly as the frequency of the ripple voltage increases. The response achieved by the introduction of the alternating current amplifier is represented by the upper solid line, the shaded area indicating the improvement realized without phase shift and without loss of stability.

It will be understood that this invention is susceptible to modification in order to adopt it to different usages and conditions and, accordingly it is desired to comprehend such modifications within this invention as may fall within the scope of the appended claims.

I claim:

1. In a regulated power supply comprising a variable impedance between the input and output of the supply and capable of rapid, ripple-free response with a high degree of stability at high gain, a voltage feedback direct current amplifier, an alternating current amplifier in parallel with the direct current amplifier connected between the input and output of the direct current amplifier means to impress voltage variations on the amplifiers, a summing circuit connected to the outputs of the A. C. and D. C. amplifier for the summing of the voltage outputs thereof, and means to impress the summed voltage output on the variable impedance to control the voltage drop across the same to thereby maintain the output voltage of the supply substantially constant.

2. In a regulated power supply having a variable impedance between the input and output of the supply and capable of rapid, ripple-free response with a high degree of stability at high gain, a voltage feedback direct current amplifier, an alternating current amplifier in parallel with the direct current amplifier and connected between the input and output thereof, means to feed back voltage variations from the output to the amplifiers, means to sum the outputs of the alternating current and direct current amplifiers and means to impress the summed outputs on the variable impedance to control the voltage drop across the same.

3. A regulated power supply comprising a variable impedance between the input and output of the supply, a direct current amplifier, an alternating current amplifier in parallel with the direct current amplifier and connected between the input and output of the direct current amplifier, means to impress voltage variations on the amplifiers, circuit means to sum the voltage outputs of the amplifiers, and means to impress the summed voltage outputs on the variable impedance to control the voltage drop across the same to thereby maintain the output voltage of the supply substantially constant.

4. In a regulated power supply, comprising a variable impedance between the input and output of the supply and capable of rapid, ripple-free response with a high degree of stability at high gain, a voltage feedback direct current amplifier, said direct current amplifier having a given number of stages, and an alternating current amplifier of a lesser number of stages in parallel with the direct current amplifier connected between the input and output of the direct current amplifier means to impress voltage variations on the amplifiers, a summing circuit connected to the outputs of the A. C. and D. C. amplifier for the summing of the voltage outputs thereof, and means to impress the summed voltage output on the variable impedance to control the voltage drop across the same to thereby maintain the output voltage of the supply substantially constant.

5. A regulated power supply comprising a variable impedance between the input and output of the supply and comprising a voltage feedback direct current amplifier, a voltage feedback alternating current amplifier in parallel with the direct current amplifier, and a variable impedance between the input and output of the supply connected to the outputs of the alternating current and direct current amplifier outputs to thereby vary the impedance thereof and to regulate the voltage output of the supply.

References Cited in the file of this patent

UNITED STATES PATENTS 2,594,572 Lupo ------------------ Apr. 29, 1952